May 2, 1950          F. J. PERILLO          2,506,171
AUTOMATIC SWITCHING DEVICE
Filed Sept. 10, 1947          2 Sheets-Sheet 2
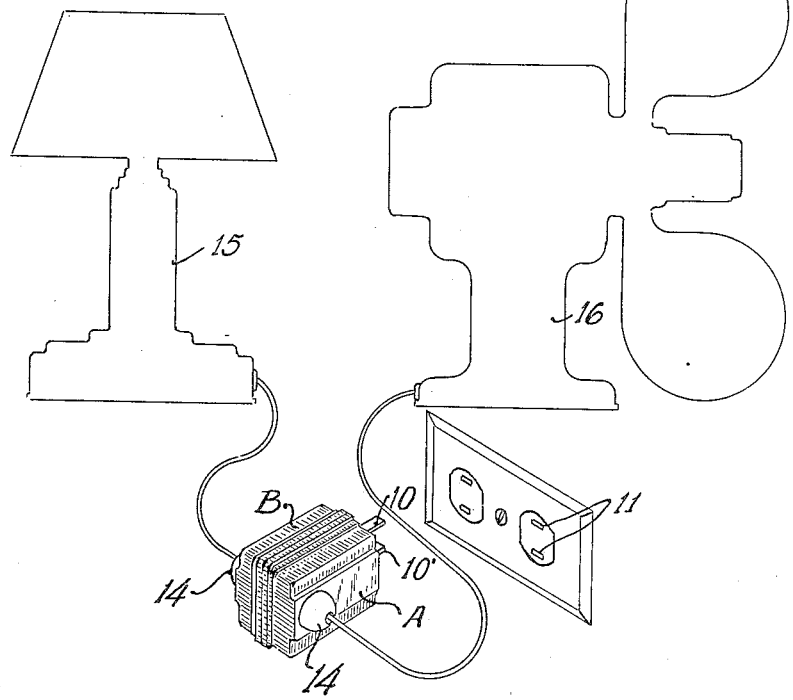
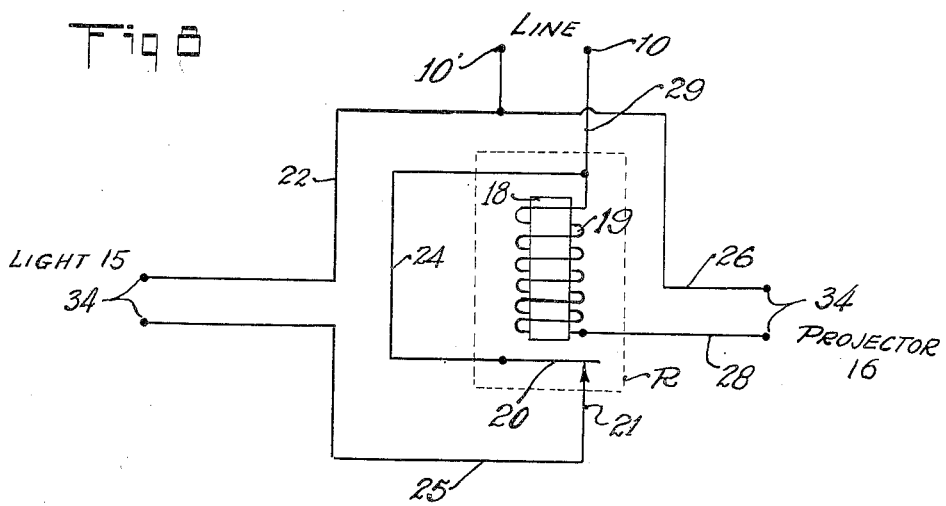
INVENTOR
Florindo J. Perillo
BY
Williams, Rich, Morse
ATTORNEYS Patented May 2, 1950

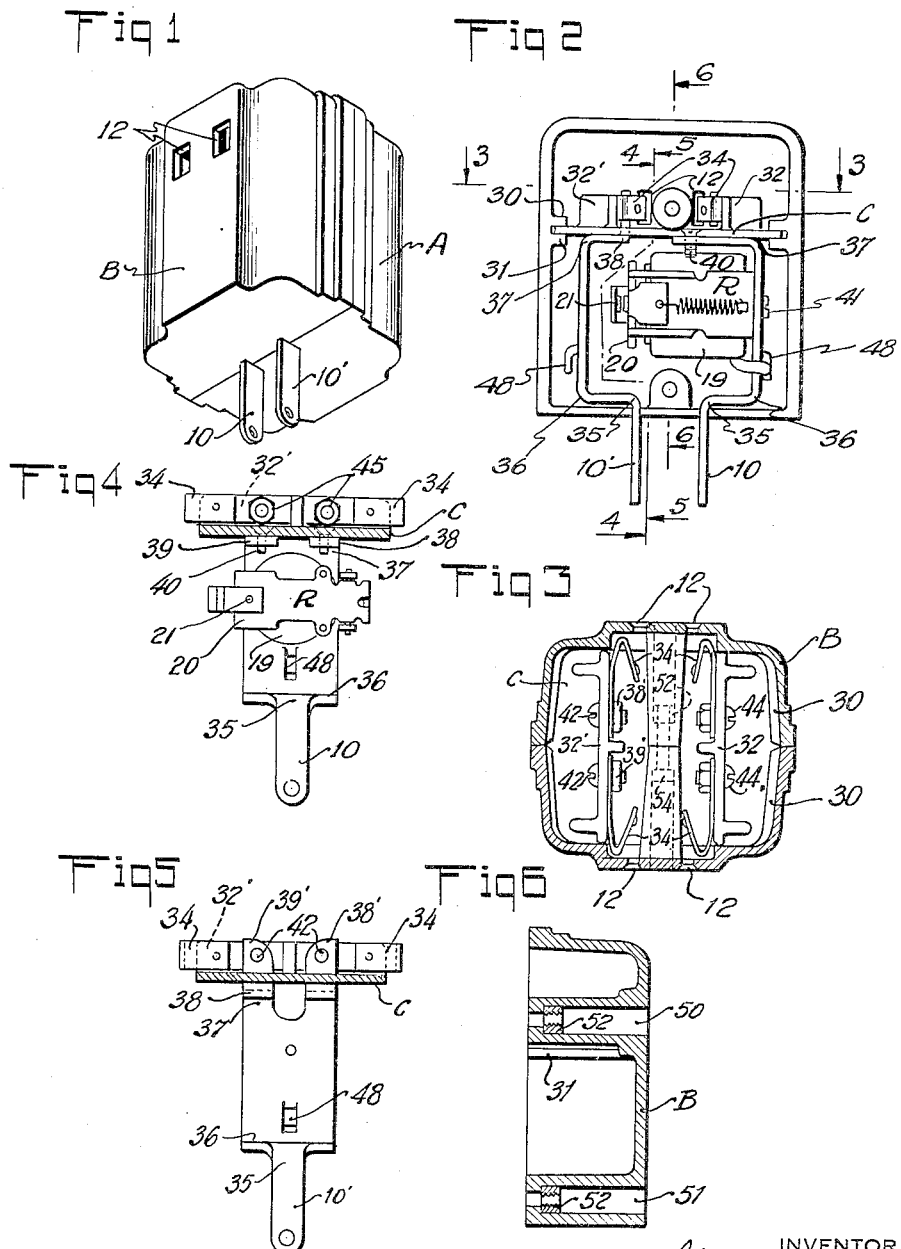

2,506,171

UNITED STATES PATENT OFFICE 2,506,171

AUTOMATIC SWITCHING DEVICE

Florindo J. Perillo, Jackson Heights, N. Y., assignor to Viewlex, Inc., Queens County, N. Y., a corporation of New York Application September 10, 1947, Serial No. 773,203

2 Claims. (Cl. 200—87)

This invention relates to switching devices and more particularly to an accessory device for use with current consuming electrically operated apparatus, such as projectors for films or slides, television sets and the like, in the use of which it is desirable to extinguish the room lights or to open a circuit for other purposes when the current consumed exceeds a predetermined value.

The principal object of the invention is to provide a switching device which automatically opens the circuit to a source of general illumination when the projection apparatus or television set is turned on and closes it again when such apparatus is turned off.

Other objects of the invention are:

(a) To provide a switching device of small size comprising receptacles for the cord plugs of a lamp and a projector, the device being provided with prongs for insertion in the usual outlet receptacle of the domestic current supply;

(b) To provide a simple, rugged structure which is easily assembled, which contains a minimum of parts, which may be sold at a modest price, and which requires no adjustment or skill to operate;

(c) To provide an automatic switching device, for use with a motion picture projector which comprises a lamp and a driving motor, which will extinguish the lights which illuminate the room when the said projector lamp is lighted, but will not extinguish the room lights when the motor alone is operating.

(d) To provide an automatic switch which may be placed in a location remote from the projector or the like enabling the operator of the projector to extinguish the room light without leaving his place beside the projector.

Other objects and advantages will in part appear, and in part will be obvious from the following detailed description of the present preferred embodiment of the invention, taken in conjunction with the drawings, in which:

Fig. 1 is a perspective view of a complete switching unit;

Fig. 2 is an elevation of said unit with one-half of the casing removed;

Fig. 3 is a section taken on the line 3—3 of Fig. 2 looking down on the contact plate to which the entire mechanism is assembled;

Fig. 4 is an elevation of the mechanism, excluding the case, taken on the line 4—4 of Fig. 2;

Fig. 5 is a view similar to Fig. 4 taken on the same line but in the direction of the arrows 5—5;

Fig. 6 is a section through one of the halves of the casing taken on the line 6—6 of Fig. 2;

Fig. 7 depicts one manner in which the device may be used; and

Fig. 8 is a circuit diagram showing the electrical connections which, for the most part, are omitted from the other figures.

Referring to Figs. 1 and 7, the entire device is assembled in a two-part casing comprising the halves A and B which are preferably made of molded dielectric material. Protruding from one end of the case are standard prongs 10, 10' adapted for insertion in the ordinary receptacle 11 used in domestic wiring systems. The two case halves A and B are identical, except for suitable indicia which may be provided on their external surfaces to assist the user in making proper connections. For example, on the case half B in Fig. 1, the word "Light" may be inscribed adjacent the openings 12 into which may be inserted the usual two-prong electrical plug 14 used on appliance cords. Similar openings are provided in the case half A and above them may be inscribed the word "Projector."

As shown in Fig. 7, the device is put into use merely by inserting the prongs 10, 10' in the house receptacle 11 and by inserting in the openings 12 of the unit the two plugs 14 of a lamp 15 and of a projector 16.

The mode of operation will be understood from the circuit diagram, Fig. 8, wherein some of the numbers correspond to those appearing on structural parts. The device is essentially an electro-magnetically operated switch or relay, the parts of which appear in Fig. 8 within the dotted line R. It comprises a core 18 surrounded by a winding 19, armature 20 and contact 21. The relay is spring biased so that the circuit is normally closed through the armature 20 and contact 21 which, as will appear, connects the light 15 directly with the line.

The winding 19 may be varied in its electrical characteristics in accordance with the particular use for which the device is designed. For example, the relay may be so designed that the contacts remain closed until the current flowing through winding 19 exceeds 100 watts and remain open until the current drops substantially below 100 watts. Suitable variations in these characteristics to adapt the device to use with appliances consuming different amounts of current will readily be understood by those skilled in the art of designing relays.

When the current is sufficient to attract armature 20 away from contact 21, the circuit to the light 15 is opened and the light is extinguished, it being understood that the light circuit comprises the conductor 22 connected directly with one side of the line and the conductors 29, 24, armature 20, contact 21 and conductor 25 connecting the light to the other side of the line.

The projector 16 or other device in conjunction with which the switching unit is used is attached to the conductor 26 which is connected directly to the line and conductor 28 which is attached to one end of the relay winding 19. The other end of this winding is connected to the line through conductor 29.

Taking an ordinary home movie projector as an example and assuming that it is connected to the conductors 26 and 28, the motor may be turned on and receive current, drawing perhaps 40 watts. This is insufficient to attract armature 20 away from contact 21 and the light attached to conductors 22 and 25 is unaffected. When, however, the projection lamp, drawing a current of say 150 watts, is turned on, the relay is actuated to open the light circuit and the light 15 is immediately extinguished.

Referring now to Figs. 2 through 6, the details of construction of the preferred form of a device embodying the invention will be described.

The case halves A and B are each provided with parallel ribs 30 and 31 between which is a slot in which the contact plate C is rigidly supported. Plate C has a flat undersurface and on its upper surface is provided with parallel upstanding contact supports 32, 32' to which are attached, as hereinafter more particularly described, spring contacts 34 of the type commonly found in receptacles. These contacts lie behind the apertures 12 in the housing to be engaged by the prongs of appliance plugs inserted therethrough. The four apertures 12 and four contacts 34 provide two receptacles in the housing.

The relay R is mounted on a metal bracket, the lower end of which forms the prong 10. As may be seen in Figs. 2 and 4 this bracket is bent at right angles at the points 35, 36 and 37 and is bifurcated at its upper end forming the legs 38 and 39. Each of these legs is tapped near its end to receive a holding screw 40 by which it is attached to the underside of plate C. Relay R is held to this bracket intermediate the bends 36 and 37 by a single screw 41. This same bracket, modified by an additional bend 38, as shown in Figs. 2 and 5, which throws the legs 38' and 39' upwardly and parallel to the prong 10, is inserted upwardly through apertures provided in plate C for that purpose, the legs 38' and 39' being parallel to the inner face of the adjacent contact support 32'. One pair of contacts 34 is clamped between these legs and support 32' by screws 42, as shown in Figs. 3 and 5. These two contacts, being attached to the same metal bracket, correspond to the conductors 22 and 26 in Fig. 8 and are connected to the line through the prong 10'.

Referring to Figs. 3 and 4, the other pair of contacts 34 are fastened to the other support 32 by bolts 44 and nuts 45. Being supported on an insulating body, they are connected in the relay circuit by wires (not shown) corresponding to conductors 25 and 28 in Fig. 8. To provide a convenient point of connection for some of the wiring, soldering lugs 48 are punched out of the bracket members above described.

The casing parts A and B are molded with shouldered screw-receiving sockets 50 and 51, Figs. 3 and 6, by means of which the two halves of the case are fastened together. Preferably one of the halves of the case is provided with threaded collars 52 pressed into the sockets to receive the holding screws 54.

It will thus be seen that the entire mechanism is assembled as a unit on the contact plate C and is completely wired before it is assembled in the case by slipping the plate C between the ribs 30 and 31 of one case part and then slipping the other case part over the outwardly extending edges of plate C. It will be understood that the case parts are slotted at their bottom edges to receive the prongs 10, 10'.

It will be understood that the electro-magnetically operated switch is designed to open and remain open only when and only as long as the current in its electro-magnet coil exceeds the minimum amount of current required by the projector; that the prong 10 is connected to one contact in each of said pairs of contacts 34; and that the prong 10' is connected through the electro-magnet coil 19 to the other contact in one pair of contacts 34 and also through the armature and switch contact 21 to the other contact in the other pair of contacts 34.

*Operation*

The mechanism above described may be provided in types having relays suited to different conditions of use, for example with projection apparatus utilizing projection lamps within different ranges of wattage, or with television sets of varying power consumption. The device is placed in use, after selection of the proper type, merely by plugging the prongs 10, 10' into a domestic outlet receptacle, plugging the appliance into the side of the casing marked for that purpose and plugging the room light into the opposite side. Assuming the room light 15 plugged into the unit to be turned on, it will be instantly extinguished when the projection lamp of a projector 16 is turned on, and the room light 15 will go on again automatically when the lamp in the projector 16 is turned off. The device is exceedingly compact, rugged and requires no adjustment. In Figs. 2 through 6 of the original drawings it is shown substantially full size.

It is to be understood that the invention is not limited to the particular details of construction of the illustrative embodiment herein described, nor in its application in use to the uses particularly described, but is to be construed broadly within the purview of the claims.

What is claimed is:

1. A switching device comprising a casing provided with openings and divided into halves, each of said halves having parallel grooves extending inwardly from the open sides of said halves and in alignment when said halves are joined; a plate supported in said grooves and dividing the space within said casing into upper and lower compartments; two pairs of contacts mounted on one side of said plate, each of said pairs being adapted to be engaged by the prongs of a plug inserted through certain of the openings in said casing; a pair of conductive brackets secured to the other side of said plate and extending through said lower compartment, the lower ends of said brackets being formed into prongs extending through certain of the openings and outside of said casing and adapted to cooperate with an electrical outlet receptacle; and a normally-closed electro-magnetically operated switch mounted within said casing on one of said brackets and designed to open and remain open when the current in its electro-magnet exceeds a certain value; one of said prongs being connected to one contact in each of said pairs, and the other of said prongs being connected through the electro-magnet coil to the other contact in one pair and through the switch to the other contact in the other pair.

2. A switching device comprising a casing provided with six openings; a pair of prongs mounted in said casing and projecting through two of said openings and adapted to cooperate with an electric outlet receptacle; a pair of contacts located in said casing adjacent another two of said openings and adapted to be engaged by the prongs of an electric plug; another pair of contacts located in said casing adjacent the other two of said openings and adapted to be engaged by the prongs of another electric plug; a normally-closed electro-magnetically operated switch located in said casing and designed to open and remain open only when and only as long as the current in its electro-magnet coil exceeds a certain amount of current; one of the prongs of the switching device being connected to one contact in each of said pairs of contacts, and the other of said last-mentioned prongs being connected through the electro-magnet coil to the other contact in the pair of contacts intended to be engaged by the first-mentioned plug and also through said switch to the other contact in the pair of contacts intended to be engaged by the second-mentioned plug.

FLORINDO J. PERILLO.

REFERENCES CITED

The following references are of record in the file of this patent:

UNITED STATES PATENTS

| Number | Name | Date |
| --- | --- | --- |
| 1,429,062 | Cornica | Sept. 12, 1922 |
| 1,669,784 | Scofield | May 15, 1928 |
| 1,990,176 | Fried | Feb. 5, 1935 |
| 2,248,511 | Rust | July 8, 1941 |
| 2,427,111 | Tolmie | Sept. 9, 1947 |